(12) United States Patent
Barbier et al.

(10) Patent No.: US 7,722,971 B2
(45) Date of Patent: May 25, 2010

(54) ELECTRIC GENERATOR FOR MOTOR VEHICLE

(75) Inventors: Samuel Barbier, Le Bizot (FR); Fabien Boudjemaa, Puteuax (FR); Gerard Olivier, Bougival (FR); Abdelhakim Oulefki, Aubervilliers (FR); Robert Yu, Elancourt (FR)

(73) Assignee: Renault S.A.S, Boulogne Billancourt (FR)

( * ) Notice: Subject to any disclaimer, the term of this patent is extended or adjusted under 35 U.S.C. 154(b) by 382 days.

(21) Appl. No.: 11/576,927

(22) PCT Filed: Oct. 6, 2005

(86) PCT No.: PCT/FR2005/050823

§ 371 (c)(1),
(2), (4) Date: Apr. 9, 2007

(87) PCT Pub. No.: WO2006/040490

PCT Pub. Date: Apr. 20, 2006

(65) Prior Publication Data

US 2008/0050624 A1 Feb. 28, 2008

(30) Foreign Application Priority Data

Oct. 8, 2004 (FR) .................................. 04 10652

(51) Int. Cl.
*H01M 8/04* (2006.01)
*H01M 8/06* (2006.01)

(52) U.S. Cl. .......................................... 429/20; 429/26

(58) Field of Classification Search .................... 429/19, 429/20, 26

See application file for complete search history.

(56) References Cited

U.S. PATENT DOCUMENTS

| | | | | |
|---|---|---|---|---|
| 6,083,637 A | * | 7/2000 | Walz et al. | 429/19 X |
| 6,521,204 B1 | | 2/2003 | Borup et al. | 423/652 |
| 6,572,994 B1 | | 6/2003 | Shimotori et al. | 429/26 |
| 6,818,336 B2 | * | 11/2004 | Isom et al. | 429/19 X |
| 7,146,801 B2 | * | 12/2006 | Kamijo et al. | 429/20 X |
| 2003/0129108 A1 | * | 7/2003 | Burch et al. | 422/188 |

FOREIGN PATENT DOCUMENTS

| | | |
|---|---|---|
| EP | 1 021 845 | 7/2000 |
| WO | 99 13521 | 3/1999 |
| WO | 00 39875 | 7/2000 |
| WO | 03 060043 | 7/2003 |

OTHER PUBLICATIONS

U.S. Appl. No. 11/721,250, filed Jun. 8, 2007 Boudjemaa et al.

* cited by examiner

*Primary Examiner*—Stephen J. Kalafut
(74) *Attorney, Agent, or Firm*—Oblon, Spivak, McClelland, Maier & Neustadt, L.L.P.

(57) ABSTRACT

An electric generator for a motor vehicle, including: a reformer for producing a reformate from a primary fuel, water and air; circuits supplying the reformer with primary fuel, air, and water; a fuel cell for production electric power from the reformate and air; a compressor for compressing the air for the fuel cell and/or the reformer; and circuits for supplying the fuel cell with reformate and air, connecting the fuel cell to the reformer and the compressor, respectively. The circuits supplying water to the reformer include a first heat exchanger for establishing heat exchange relationship between the water and the air compressed by the compressor.

6 Claims, 6 Drawing Sheets

ELECTRIC GENERATOR FOR MOTOR VEHICLE

The invention relates to an electric generator for a motor vehicle, comprising
- a reformer for producing a reformate from a primary fuel, air and water,
- circuits supplying said reformer with primary fuel, air and water,
- a fuel cell for producing electric power from said reformate and air,
- a compressor for compressing the air supplied to said fuel cell and/or to said reformer,
- circuits supplying said fuel cell with reformate and with air, connecting said fuel cell to said reformer and to said compressor, respectively.

Such an electric generator, or "power module" is used particularly in a motor vehicle V to supply the electricity-consuming elements of the vehicle, particularly an electric traction engine. It is used to convert a fuel carried in the vehicle into electric power.

The fuel may be hydrogen, directly consumable by the fuel cell. For greater autonomy, a primary fuel easier to store is generally used, such as gasoline, diesel, naphtha, alcohol, an ester or a hydrocarbon. The generator then comprises reforming means, that is means for converting the primary fuel to hydrogen.

Figure 1:
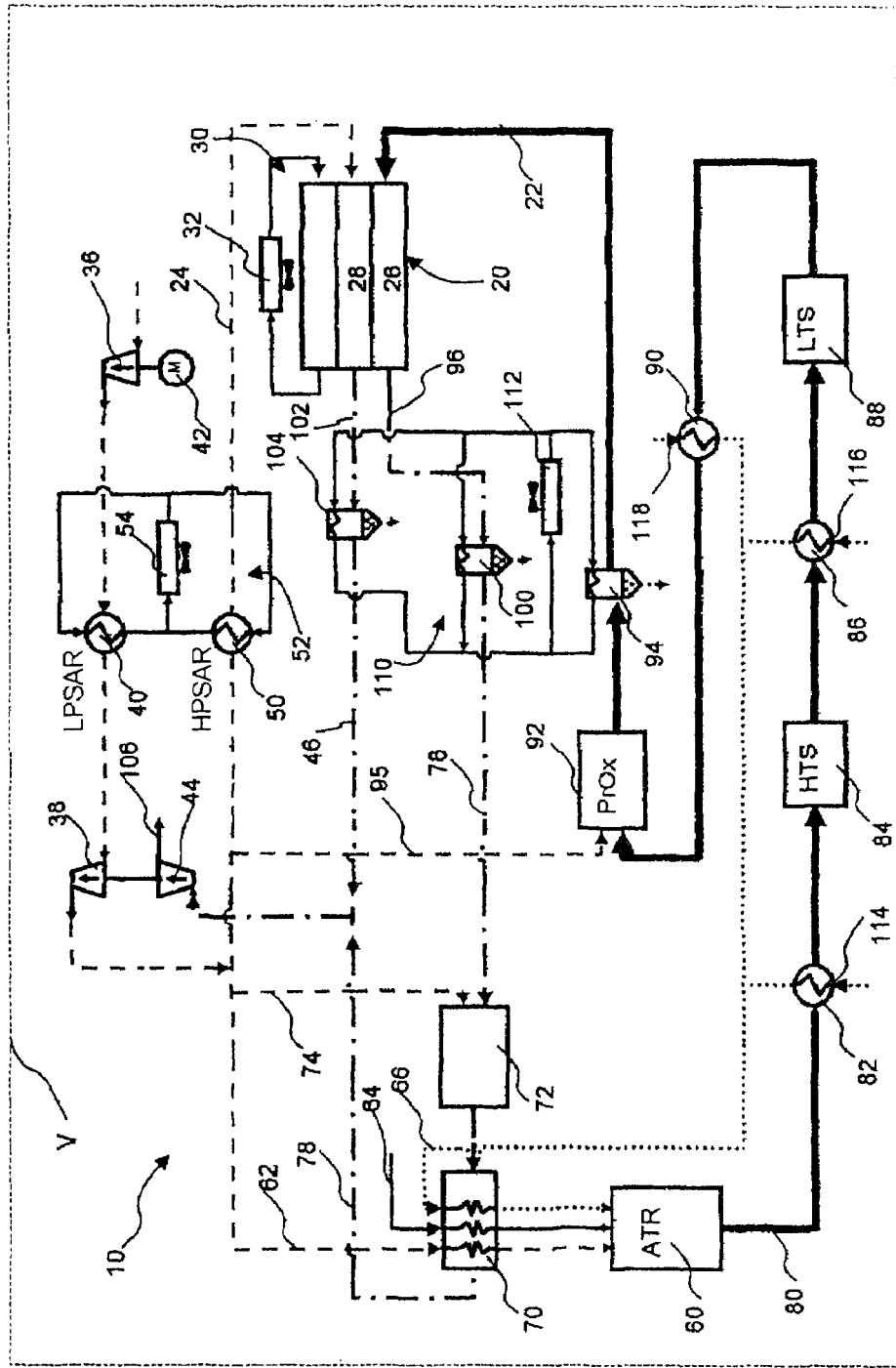

FIG. 1 shows a typical simplified architecture of an electric generator 10 of the prior art.

The generator shown comprises a fuel cell 20, for example of the PEMFC type, supplied with hydrogen and oxygen, via lines 22 and 24, respectively. The fuel cell 20 comprises an anode compartment 26 and a cathode compartment 28 cooled by a cell cooling circuit 30 comprising a radiator 32 capable of discharging the heat energy recovered to the exterior.

The oxygen is supplied by the outdoor air, successively compressed by a low-pressure (LP, compressor 3 and a high-pressure (HP) compressor 38 separated by a heat exchanger 40, called a "Low Pressure Supercharging Air Radiator" or LPSAR heat exchanger.

The LP compressor 36, suitable for compressing the air to a pressure conventionally of between 2 and 3 bar, is driven by a motor 42.

The HP compressor 38 is suitable for compressing the air leaving the LPSAR heat exchanger at a pressure conventionally of between 4 and 5 bar. The HP compressor 38 is coupled with a turbine 44 recovering the mechanical energy by expansion of the hot exhaust gas issuing from the fuel cell 20 transported by a line 46.

Another heat exchanger 50, called "HPSAR" is provided downstream of the HP compressor 38 to cool the compressed air to the operating temperature of the fuel cell 20. The HPSAR 50 and LPSAR 40 heat exchangers are integrated in an air cooling circuit 52, comprising a radiator 54 capable of discharging the heat energy recovered to the exterior.

The generator 10 further comprises reforming means, or a Fuel Processing System (FPS) comprising an autothermal reactor called "ATR" or "reformer 60" capable, in the presence of air and steam, of converting the primary fuel to a hydrogen-rich reformate.

The reformer 60 is supplied with compressed air from the outlet of the HP compressor 38, via a line 62, supplied with primary fuel, from a tank not shown, via a line 64, and supplied with water, in vapor form, via a line 66.

Prior to their introduction into the reformer 60, the reactants, that is, the primary fuel, water and air, are heated to about 700° C. via a heat exchanger 70 using a catalytic burner 72. The catalytic burner 72 is supplied with compressed air by the HP compressor 38 via a line 74, and with residual hydrogen, that is, not consumed by the fuel cell 20, via a line 76. After passing through the heat exchanger 70, the exhaust gases from the burner 72 are sent, via a line 78, to the inlet of the turbine 44, and then discharged to the exterior.

The reformate produced by the reformer 60, conveyed by a line 80, passes, successively in the reformate flow direction, through a High Temperature Shift (HTS) heat exchanger 82, an HTS purifier 84, a Low Temperature Shift (LTS) heat exchanger 86, an LTS purifier 88, a Preferential Oxidation (PrOx) heat exchanger 90, a preferential oxidation reactor PrOx 92, and a pre-anode condenser 94, before rejoining the anode compartment 26 of the fuel cell 20. The preferential oxidation reactor PrOx 92 is further supplied with compressed air from the HP compressor 38 via a line 95.

The purification and Preferential oxidation serve to convert a large part of the CO present in the reformate to $CO_2$.

The HTS 82, LTS 86 and PrOx 90 heat exchangers are used to cool the reformate between each treatment stage. They are cooled by a water flow to the reformer 60, the heat energy recovered by the water being usable in the heat exchanger 70 to vaporize and heat the reactants of the reformer 60, as shown, or of being used by an external cooling circuit. In FIG. 1, the water exit streams of the HTS 82, LTS 88 and PrOx 90 heat exchangers thus meet in the common line 66 connected to the inlet of the reformer heat exchanger 70.

In the fuel cell 20, the hydrogen present in the reformate is partially converted by an electrochemical reaction to supply electricity. The hydrogen not consumed by the fuel cell 20, leaving the anode compartment 26 via a line 96, passes through an anode condenser 100, and then supplies the burner 72 via the line 76. The hot air leaving the cathode compartment 28 via a line 102 passes through a cathode condenser 104, and is then sent, via the line 46, to the turbine 44 and discharged to the exterior via the line 106.

The anode 100, cathode 104 and pre-anode 94 condensers are cooled by means of a condenser cooling circuit reference 110, comprising a radiator 112 for discharging the heat energy recovered to the exterior. The water recovered by these condensers is sent, via lines not shown, to a tank not shown, and then, as required, pumped to the inlets 114, 116 and 118 of the HTS 82, LTS 86 and PrOx 90 heat exchangers.

The circuits 30, 52 and 110 for cooling the fuel cell 20, the air compressed by the compressors 36 and 38 and the condensers 94, 100 and 104, respectively, have been shown separately from one another for the clarity of the drawing. In fact, these three circuits are merged into a single cooling circuit, hereinafter the "vehicle cooling circuit".

The generator 10 in FIG. 1 operates as follows.

The LP 36 and HP 38 compressors, separated by the LPSAR heat exchanger 40, use compressed air at about 190° C. and at a pressure of about 4.5 bar.

The LPSAR heat exchanger 40 cools the air heated by the LP compressor 36, thereby increasing the compression ratio and reducing the mechanical work required for each compressor.

The compressed air supplies the burner 72, the reformer 60 via the heat exchanger 70, and the cathode compartment 28 of the fuel cell 20 via the HPSAR heat exchanger 50. Downstream of the HPSAP heat exchanger 50, the temperature of the compressed air is about 110° C.

The heat exchanger 70 of the reformer 60, heated by the exhaust gases from the burner 72, heats all the reactants supplied to the reformer 60 to a temperature suitable for reforming the fuel, the temperature of the reformer 60 typically being about 700° C. The reformate issuing from the reformer 60 is then cooled to about 400° C. by the HTS heat exchanger 82, and then to about 200° C. by the LTS heat exchanger 86, and then finally to about 120° C. by the PrOx heat exchanger 90. The reformate can thereby be purified effectively in the HTS 84 and LTS 88 purifiers, and then preferentially oxidized in the PrOx oxidation reactor 92. It then passes through the pre-anode condenser 94 which cools it to a temperature of about 80 to 110° C. suitable for its injection into the anode compartment 26 of the fuel cell 20. The pre-anode condenser 94 also has the function of recovering part of the steam contained in the purified reformate.

In the fuel cell 20, the hydrogen from the reformate injected is partially converted by an electrochemical reaction to supply electricity. The residual hydrogen leaving the anode compartment at a pressure of about 3 bar is used by the burner 72, after recovery of the steam in the anode condenser 100. The exhaust gases from the cathode compartment 28, at a pressure of about 3 bar, after recovery of the steam in the cathode condenser 104, are used by the turbine 44 and then discharged to the exterior.

In a motor vehicle, the permanent water supply to the regenerator 10 must be guaranteed. The water recovered in the anode 100, cathode 104 and pre-anode 94 condensers, at about 60° C., is therefore reused to supply the reformer with water.

In operation, the fuel cell 20 generates a heating power of about 60 to 70 kW. The condensers 94, 100 and 104 generate about 30 to 40 kW and the heat exchangers 40, 50, 82, 86 and 118 generate a total of about 10 kW. The vehicle cooling circuit must therefore exchange a heating power of about 100 to 120 kW with the surrounding environment, for a gross electric capacity of the fuel cell 20 of 70 kWe.

The removal of this heat implies dimensional constraints, particularly of the radiators 54, 112 and 32, making it difficult to incorporate the generator 10 in a motor vehicle.

It is the object of the present invention to supply a generator of the type described in the introduction, offering reduced size and/or improved efficiency, in order to facilitate its incorporation in the vehicle.

According to the invention, this object is obtained by means of an electric generator for a motor vehicle, comprising
   a reformer for producing a reformate from a primary fuel, air and water;
   circuits supplying said reformer with primary fuel, air and water;
   a fuel cell for producing electric power from said reformate and air;
   a compressor for compressing the air supplied to said fuel cell and/or to said reformer; and
   circuits supplying said fuel cell with reformate and with air, connecting said fuel cell to said reformer and to said compressor, respectively.

The inventive generator is characterized in that said circuit supplying water to said reformer comprises a first heat exchanger for establishing a heat exchange between said water and said air compressed by said compressor.

The water passing through the first heat exchanger cools the air sent to the fuel cell and/or the reformer. The water thereby recovers heat energy when passing through the first heat exchanger. It is therefore preheated when it reaches the heat exchanger placed upstream of the reformer. Advantageously, the additional heat energy required for the water temperature to be suitable for its injection into the reformer, conventionally supplied by a catalytic burner, is therefore reduced. This produces a gain in energy and an improvement of the energy balance of the generator.

Furthermore, the water passing through the first heat exchanger cools the compressed air, which advantageously relieves the vehicle cooling circuit. The heat power to be discharged to the exterior by said vehicle cooling circuit is therefore reduced. This advantageously reduces the dimensions of the cooling circuit and improves its integration in the vehicle.

Preferably, the inventive generator also has the following features.

Said circuit supplying water to said reformer comprises at least one second heat exchanger, inserted downstream of said first heat exchanger, for establishing a heat exchange between said water and said reformate flowing in said circuit supplying reformate to said fuel cell. As shown in greater detail in the rest of the description, this configuration further improves the total energy efficiency of the generator and serves to reduce the size of the cooling circuit.

Said circuit supplying water to said reformer comprises, downstream of said first heat exchanger, a plurality of said second heat exchangers connected in parallel and capable of establishing a heat exchange between said water and said reformate flowing in said circuit supplying reformate to said fuel cell.

Said circuit supplying reformate to said fuel cell comprises one or more reformate purifiers and/or oxidation reactors, at least one of said second heat exchangers being inserted between said reformer and any one of said purifiers and/or oxidation reactors, and/or between any two of said purifiers and/or oxidation reactors.

Said second heat exchanger is inserted into said circuit supplying water to said reformer upstream of a heat exchanger for vaporizing said water.

Said compressed air is also sent to a burner for heating said primary fuel and/or air and/or water sent to said reformer.

The invention also relates to a motor vehicle comprising an electric generator of the invention.

Other features and advantages of the present invention will appear from a reading of the description that follows and the examination of the drawing appended hereto in which:
   FIG. 1, described in the introduction schematically shows an electric generator of the prior art; and,
   FIGS. 2 to 6 schematically show various alternatives of the generator of the invention.

In the various figures, identical numerals have been used to denote identical or similar members.

In all the figures, the circuits supplying air to the fuel cell, the burner, the preferential oxidation reactor and the reformer have been shown by a broken line. The circuit supplying reformate to the fuel cell has been shown by a bold line. The circuit supplying water to the reformer has been shown by a dotted line. The lines conveying the exhaust gases from the fuel cell have been shown by a mixed line.

Figure 2:
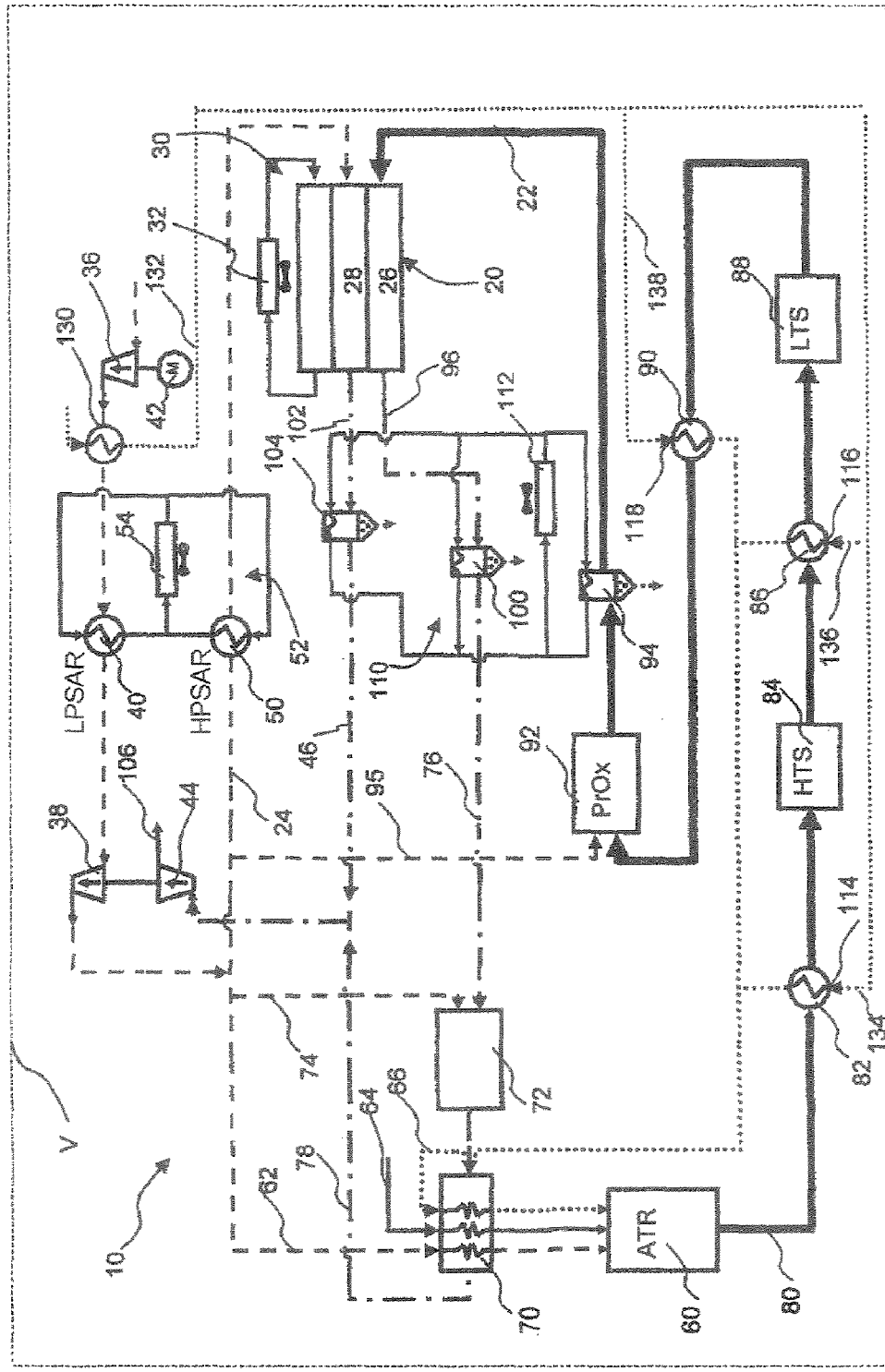

FIG. 1 having been described in the introduction, we shall now refer to FIG. 2.

The generator 10 shown in FIG. 2 comprises in addition to that shown in FIG. 1, an additional LPSAR heat exchanger numeral 130, inserted immediately downstream of the LP compressor 36, the LPSAR heat exchanger 130 is cooled by a water flow, entering the heat exchanger at about 20° C. and about 8 bar. Passing through the heat exchanger 130 the water is heated by the hot air issuing from the LP compressor 36 at about 190° C. At the outlet of the heat exchanger 130, the water is conveyed via a line 132, and then parallel bypasses 134, 136 and 138, to the HTS 82, LTS 88 and pre-anode 90 heat exchangers, respectively. The passage through the HTS, LTS and pre-anode heat exchangers causes vaporization of the water, enabling these heat exchangers to be qualified as vaporization heat exchangers. The steam then passes through the heat exchanger 70 where it is heated to the inlet temperature of the reformer 60 by the heat produced in the catalytic burner 72. It is then infected into the reformer 60.

After having been partially cooled by the water of the reformer 60, the air is cooled to a temperature suitable for the HP compressor 38 by the LPSAR heat exchanger 40 conventionally inserted into the vehicle cooling circuit. Advantageously, the upstream cooling by the additional heat exchanger 130 serves to limit the cooling capacity required of the vehicle cooling circuit. The use of the cooling circuit to cool the air also helps to guarantee optimal control of the temperature of the air entering the HP compressor 38, which is particularly advantageous during transient operating phases. The cooling of the additional LPSAR heat exchanger 130 by the water sent to the reformer 60 serves to utilize 3 to 7 kWt and commensurately to reduce the load of the cooling circuit.

The recovery, using the additional LPSAR heat exchanger 130, of part of the heat energy required to vaporize and heat the water, serves to draw less heat energy from the catalytic burner 72. The input of 5 kW at the additional LPSAR heat exchanger 130 thereby serves to decrease by 5 kW the heating capacity withdrawn from the hot gas leaving the catalytic burner 70 and intended to heat the reactants of the reformer 60 in the heat exchanger 70. The temperature of this gas when it enters the turbine 44 is thereby increased, and this advantageously increases the recovery of mechanical energy in the turbine by 1 to 2 kW. This increase in mechanical energy recovery in the turbine 44 serves to increase the compression ratio of the HP compressor 38 and to reduce that of the LP compressor 36. The electric power consumption of the compressors is thereby slightly reduced and the quantity of electricity available for traction of the vehicle is advantageously increased by about 1 to 2 kW.

The total efficiency of the generator is increased by 0.5 to 1%.

Figure 3:
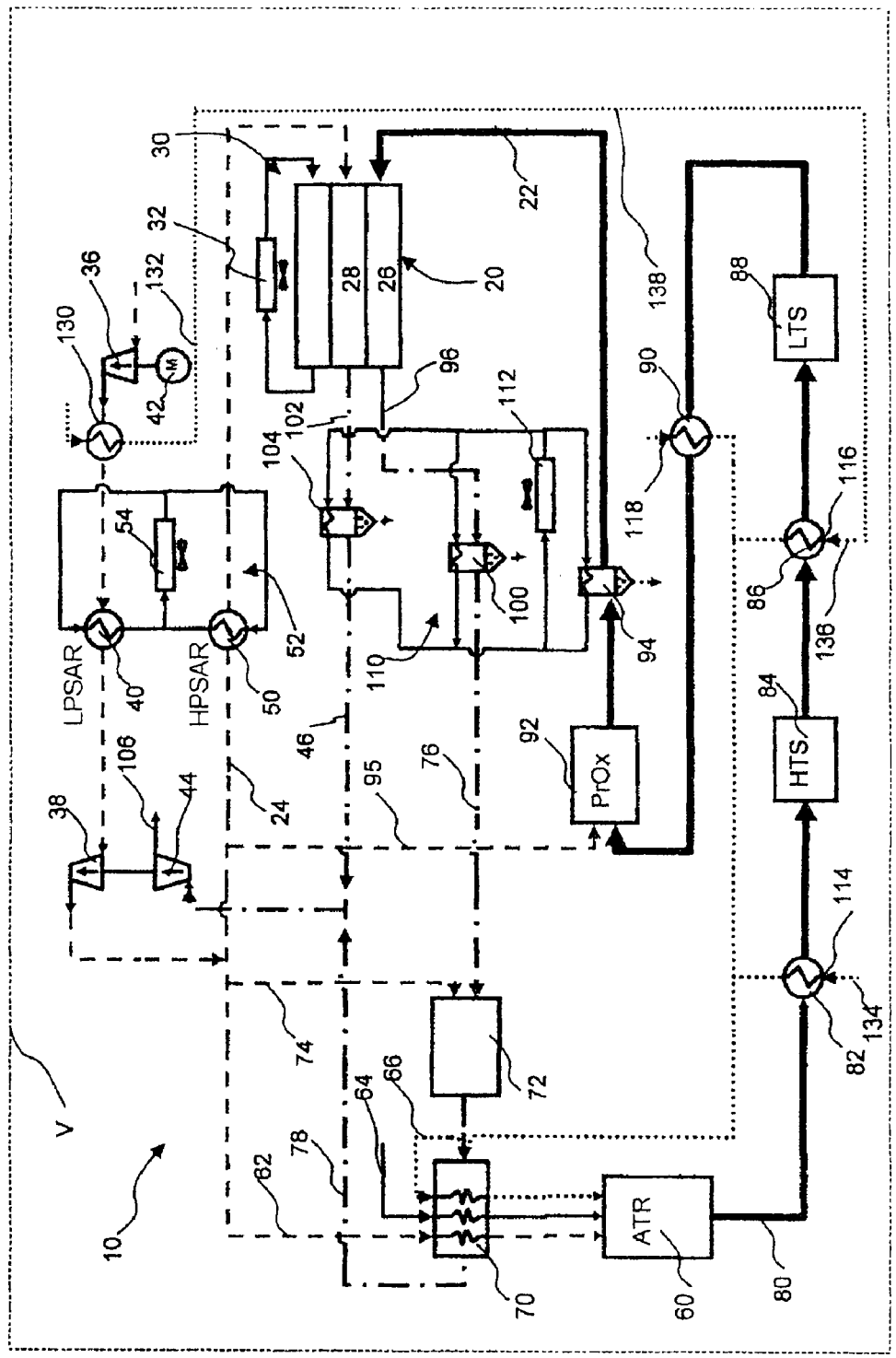

As shown in FIG. 3, the hot water leaving the additional LPSAR heat exchanger 130 does not necessarily then pass through the three HTS 82, LTS 86 and pre-anode 90 heat exchangers. In FIG. 3, for example, it only passes through the one LTS heat exchanger 86, in which it is vaporized.

Figure 4:
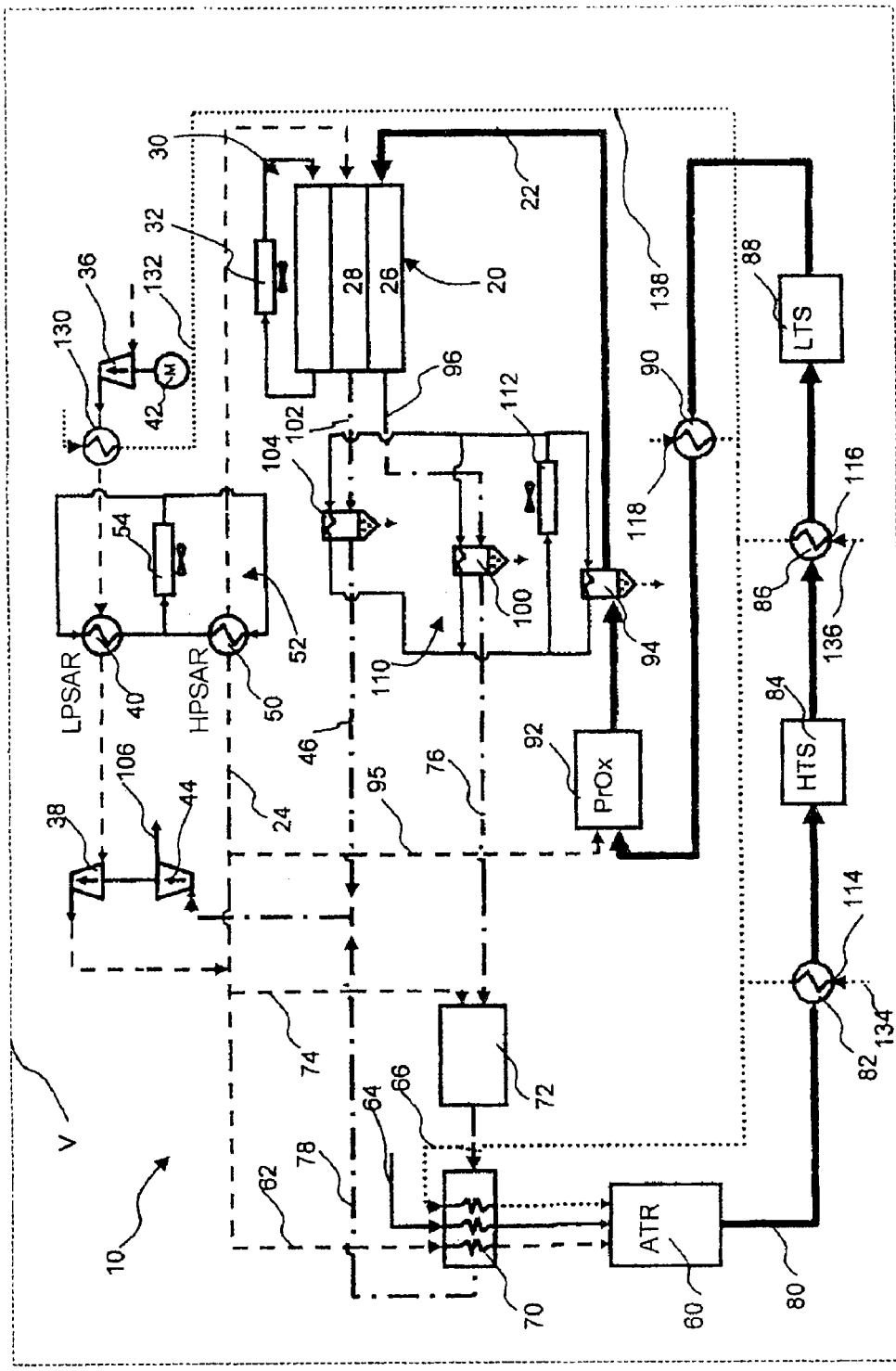

In the alternative of the invention shown in FIG. 4, the additional LPSAR heat exchanger 130 is connected to the circuit supplying water to the reformer 60 in parallel with the HTS 82, LTS 86 and pre-anode 90 heat exchangers, all the waters heated in the heat exchangers 130, 82, 86 and 90 meeting at the inlet of the heat exchanger 70. The heated water exit stream from the additional LPSAR heat exchanger 130 thus does not pass through any of the three HTS 82, LTS 86 and pre-anode 90 heat exchangers.

Figure 5:
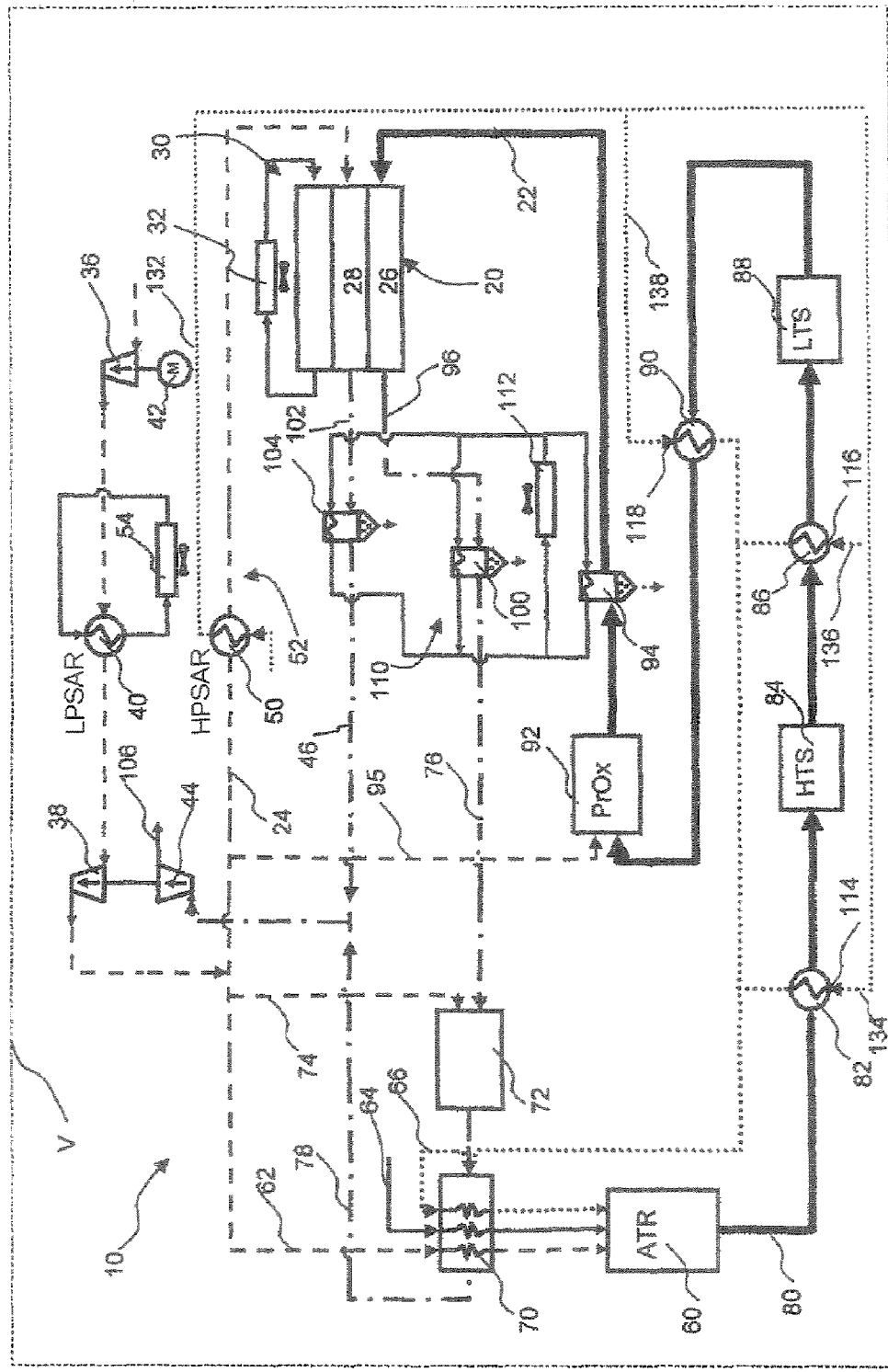

In the alternative of the invention shown in FIG. 5, similar to that in FIG. 2, the circuits cooling the air issuing from the LP 36 and HP 38 compressors have been dissociated. The LPSAR heat exchanger 40 is cooled by the vehicle cooling circuit, as in the prior art. On the contrary the HPSAR heat exchanger 50 is henceforth cooled by liquid water, initially at about 20° C. and about 8 bar, which, after having passed through the HPSAR heat exchanger 50 and having been heated by the hot air leaving the HP compressor 38, is conducted, via the lines 132, 134, 136 and 138 to the HTS 82, LTS 84 and pre-anode 90 heat exchangers. The passage through the HTS, LTS and pre-anode heat exchangers causes the vaporization of the water. The steam then passes through the heat exchanger 70 heated by the burner, and then supplies the reformer 60.

The cooling of the HPSAR heat exchanger 50 by the water used in the reformer 60 serves to utilize 3 to 7 kWt of the load of the vehicle cooling circuit, and thereby alleviate the heat load to be discharged to the exterior by said circuit.

The recovery thanks to the HPSAR heat exchanger 50, of part of the heat energy required to vaporize and heat the water, serves to draw less heat energy from the catalytic burner 72. The input of 5 kW in the HPSAR heat exchanger 50 thereby, for example, serves to decrease by 5 kW the heat capacity drawn from the hot gases leaving the catalytic burner 72 and intended to heat the steam. The temperature of these gases when they enter the turbine 44 is thereby increased, and this advantageously increases the recovery of mechanical energy in the turbine by 1 to 2 kW. This increase in the recovery of mechanical energy in the turbine 44 serves to increase the compression of the HP compressor 38 and to reduce that of the LP compressor 36. The electric power consumption of the compressors is thereby reduced and the quantity of electricity available for the traction of the vehicle is advantageously increased by about 1 to 2 kW.

The total efficiency of the generator increases by 0.5 to 1%.

Figure 6:
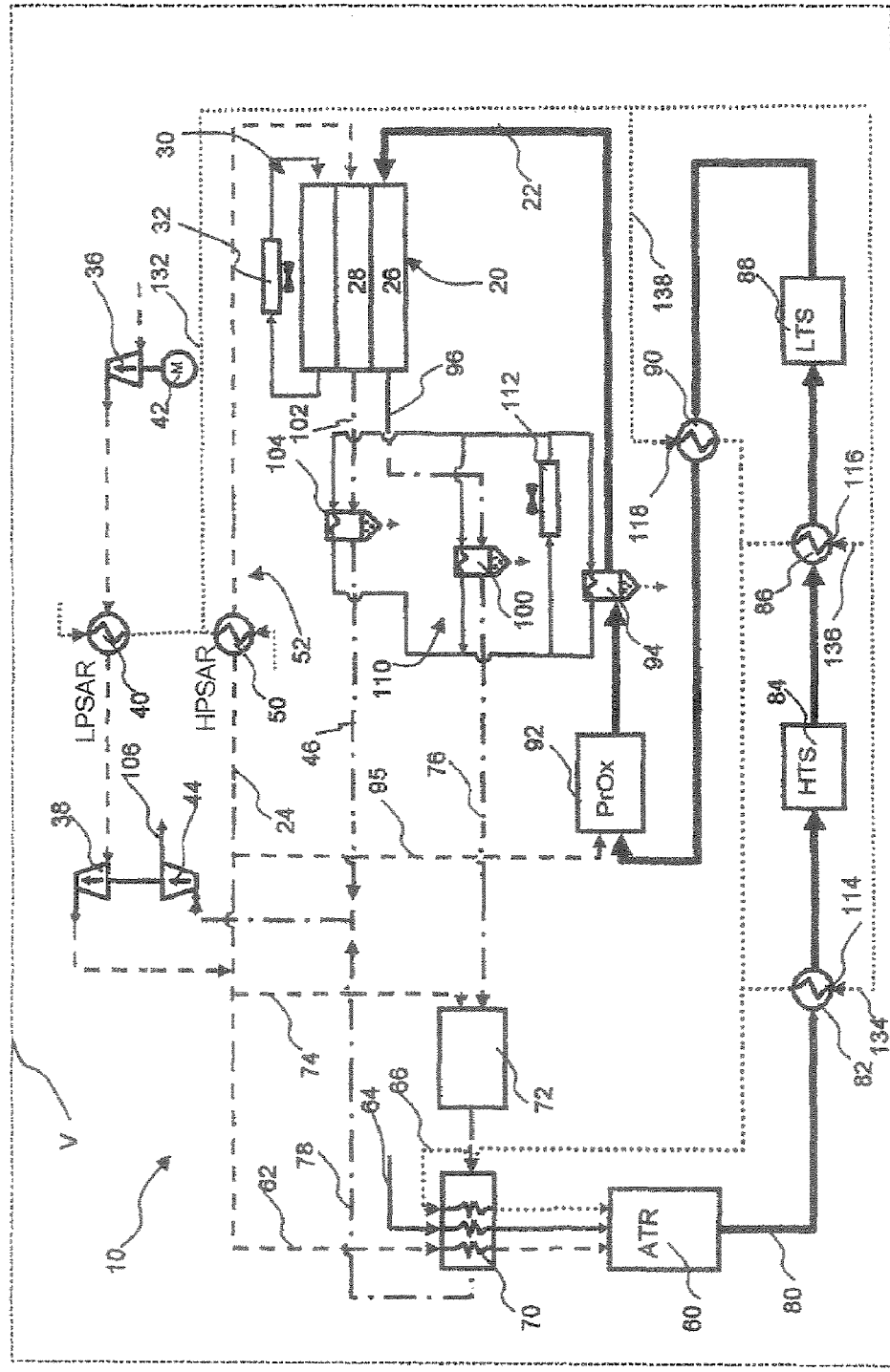

In the alternative shown in FIG. 6, neither of the LPSAR 40 and HPSAR 50 heat exchangers is cooled by the vehicle cooling circuit. Each of these heat exchangers 40 and 50 is cooled by the passage of a water stream, which then, as in the configuration in FIG. 5, is sent to the HTS 82, LTS 86 and pre-anode 90 heat exchangers, and then the reformer 60.

In all the embodiments described above, the water passing through the LPSAR 40 or HPSAR 50 heat exchangers dissociated from the vehicle cooling circuit is preferably recycled water from the anode condenser, cathode condenser and pre-anode condenser, and stored in a tank. At the outlet of this tank, the temperature is typically about 20° C., but may, depending on the vehicle running conditions, reach 60° C.

Obviously, the present invention is not limited to the embodiment described and shown provided as an illustrative and nonlimiting example. The various alternatives could, for example, be combined.

In particular, the invention is not limited to the architecture shown, and the number and positioning of the SAR, HTS, LTS and pre-cathode exchangers, or of the condensers, may be different. It is not limited to a type of fuel cell or of reformer.

The choice of an architecture depends in particular on the quantity of power developed in the SAR heat exchangers and the power required to preheat the water supplied to the reformer.

The invention claimed is:

1. An electric generator for a motor vehicle, comprising:
   a reformer which produces a reformate from a primary fuel, air, and water;
   circuits supplying said reformer with primary fuel, air, and water;
   a fuel cell which produces electric power from said reformate and air;
   a compressor which compresses the air supplied to said fuel cell and to said reformer; and
   circuits supplying said fuel cell with reformate and with air, connecting said fuel cell to said reformer and to said compressor, respectively,
   wherein said circuit supplying water to said reformer includes a first heat exchanger which establishes a heat exchange between said water and the air compressed by said compressor, and said circuit supplying water to said reformer includes at least one second heat exchanger, downstream of said first heat exchanger, which establishes a heat exchange between said water and said reformate flowing in said circuit supplying reformate to said fuel cell, and said second heat exchanger is in said circuit supplying water to said reformer upstream of a heat exchanger for vaporizing said water.

2. The electric generator as claimed in claim 1, wherein said circuit supplying water to said reformer includes, downstream of said first heat exchanger, a plurality of said second heat exchangers connected in parallel and establish a heat exchange between said water and said reformate flowing in said circuit supplying reformate to said fuel cell.

3. The electric generator as claimed in claim 1, wherein said circuit supplying reformate to said fuel cell includes one or more reformate purifiers and/or oxidation reactors, at least one of said second heat exchangers being inserted between said reformer and any one of said purifiers and/or oxidation reactors, and/or between any two of said purifiers and/or oxidation reactors.

4. The electric generator as claimed in claim 1, wherein said compressed air is also sent to a burner for heating said primary fuel and/or air and/or water sent to said reformer.

5. A motor vehicle including an electric generator as claimed in claim 1.

6. A motor vehicle including an electric generator as claimed in claim 1, wherein said at least one second heat exchanger is directly connected to said first heat exchanger and the first heat exchanger is directly connected in series to a third heat exchanger.

* * * * *